United States Patent [19]

Bertz

[11] Patent Number: 4,852,402
[45] Date of Patent: Aug. 1, 1989

[54] METHOD AND APPARATUS FOR CHECKING OR TESTING THE PROFILE OF GEAR FLANKS, PARTICULARLY OF INVOLUTE GEARS

[75] Inventor: Hans-Ulrich Bertz, Rastatt, Fed. Rep. of Germany

[73] Assignee: Willy Höfler, Karlsruhe, Fed. Rep. of Germany

[21] Appl. No.: 192,787

[22] Filed: May 11, 1988

[30] Foreign Application Priority Data

May 26, 1987 [DE] Fed. Rep. of Germany ....... 3717666

[51] Int. Cl.$^4$ ............................................. G01M 13/02
[52] U.S. Cl. .................................. 73/162; 33/179.5 R; 33/179.5 D; 33/558; 33/561; 364/560; 364/561; 364/562; 364/563
[58] Field of Search ...................... 73/162; 33/179.5 R, 33/179.5 D, 551, 552, 553, 554, 556, 558, 559, 561; 364/560, 561, 562, 563

[56] References Cited

U.S. PATENT DOCUMENTS

| 3,936,946 | 2/1976 | Ruffner et al. | 33/179.5 R |
| 4,159,242 | 5/1979 | Höfler | 73/162 |
| 4,285,133 | 8/1981 | Sterki et al. | 33/179.5 D |
| 4,322,889 | 4/1982 | Guenter | 33/179.5 R |
| 4,373,268 | 2/1983 | Spaeth | 33/179.5 R |
| 4,498,335 | 2/1985 | Thoma | 73/162 |
| 4,519,141 | 5/1985 | Meder et al. | 33/179.5 R |
| 4,532,715 | 8/1985 | Sterki | 33/179.5 R |
| 4,646,443 | 3/1987 | Höfler | 73/162 |
| 4,646,566 | 3/1987 | Höfler | 73/162 |

FOREIGN PATENT DOCUMENTS

| 1096608 | 3/1981 | Canada | 33/179.5 R |
| 2934412 | 7/1980 | Fed. Rep. of Germany | 33/179.5 R |
| 2948337 | 4/1981 | Fed. Rep. of Germany | 33/179.5 R |
| 56-14110 | 2/1981 | Japan | 33/179.5 E |
| 57-179617 | 11/1982 | Japan | 33/553 |
| 59-150304 | 8/1984 | Japan | 33/551 |
| 563566 | 6/1975 | Switzerland | 33/179.5 R |
| 2141233 | 12/1984 | United Kingdom | 73/162 |

Primary Examiner—William A. Cuchlinski, Jr.
Assistant Examiner—Diego F. F. Gutierrez
Attorney, Agent, or Firm—Frishauf, Holtz, Goodman & Woodward

[57] ABSTRACT

A measuring and sensing head (6, 30, 50) is moved under computer control in engagement with right and left flanks of gears. These may be internal or external gears. The head is moved in a tangential direction with respect to the base circle of the gear and, in accordance with the invention, additionally in a radial direction with respect to the axis (3) of the gear (2), in such a manner that, when setting right and left flanks, respectively, of a gear tooth, the paths of the measuring and sensing head form straight lines which intersect at intersection points (43, 53) outside of the base circle (32, 52) of the gear. The movement of the sensing head is controlled by a computer (C) in accordance with an involute mathematical function following the involute curve of gear teeth. Other curves, similar to an involute curve, may be controlled by the computer. The range of movement in tangential direction with respect to the gear is thereby substantially reduced and interference of the measuring or sensing head with an edge of the tooth is prevented.

7 Claims, 4 Drawing Sheets

METHOD AND APPARATUS FOR CHECKING OR TESTING THE PROFILE OF GEAR FLANKS, PARTICULARLY OF INVOLUTE GEARS

The present invention relates to a method and apparatus to test the flank profile of the flanks of gear teeth, and particularly of gear teeth having involute shape or of otherwise curved contour.

BACKGROUND

Various types of apparatus and methods are known to check or test the shape or contour of gear teeth. Usually, a measuring or sensing head is provided, which is moved in a plane transverse to the axis of a gear retained on the apparatus. The sensing head is kept in engagement with a flank of the gear tooth. The gear may be stationary or rotated and, in order to test involute-type gears, it can be moved along a path tangential to a base circle compatible with the profile of the flank. When the gear is rotated, the measuring sensor is rolled off the gear flank. The contact point of the measuring head of the tangential path, with respect to the base circle of the sensor is used to determine the contour or profile or shape of the gear tooth, with reference, for example, to the center of rotation of the gear tooth. Both right and left flanks—with reference to the center of the gear tooth—can be tested in that way upon engagement of the sensing head with the respective flank.

Methods for so testing the gear teeth, and the associated apparatus to carry out the method, are frequently used to test the flanks of involute gear teeth. The base circle of the gear forms the generatrix for the involute profile. Such apparatus and methods are also suitable to test gear teeth which are curved and somewhat different from involute curves, and which lend themselves to testing by rolling off the gear against the sensing head. The present invention is also suitable for testing such gears. Curves, in space, which are somewhat comparable to involute curves, and can be tested in accordance with prior art processes, as well as with the method and apparatus of the present invention, may be of the Wildhaber-Novikov type. The curve or course of the flank deviates in well known and fixed manner from an involute curve. The only requirement of such other curves which can be tested is that the difference between the actual tooth to be bested and an involute curve is in that region in which the sensing head can be deflected or moved from a base or rest or centered position.

German Pat. No. 32 12 082, Höfler, describes an apparatus and method to test the involute profile of gear teeth. In accordance with this disclosure, a sensor is moved in a direction along an x-axis, for example on a carriage, in the direction of an X-guide path. The origin of the involute curve to be tested is placed in the intersection of the base circle with a line perpendicular to the moving path of the X-coordinate carriage, and passing through the axis of the gear. Two measuring ranges will then result, one each for the right and the left gear teeth, which are located, correspondingly, to the right and to the left of the origin of the involute. The movement path of the carriage of the test apparatus thus must be sufficiently long in order to permit testing of both the right and left gear teeth of gears.

The apparatus, as described in the referenced German Pat. No. 32 12 082, thus becomes complex and bulky since the travel path of the carriage carrying the measuring head must be long in order to permit testing the profiles of right and left gear teeth.

Problems arise when testing gears having internal gearing. The flanks of internal gear teeth extend essentially radially inwardly and a sensing head which operates essentially from an inner towards an outer surface may collide with the gearing during testing. Such collision can be avoided by using sensing heads carried on carrier elements which are angled off or shaped to prevent such collisions. This solution, while permitting testing, is undesirable however since two different sensing heads, one for the right and one for the left flank, must be used and changing sensing heads for testing is time-consuming and leads to inaccuracies.

THE INVENTION

It is an object to provide a method and apparatus to test, or check, or measure the flanks or contours of gear teeth of gears, and particularly of gears having curved gear teeth following an involute curve or a generally or roughly involute curve, and in which the deflection path of a carriage carrying a measuring head is reduced while permitting also checking or testing or measuring internal gears without danger of collision with the gear teeth and without requiring special heads for testing a right or left flank; and especially to permit use of devices customary in the gear testing field.

Briefly, a measuring or sensing head is controlled to move in paths which are inclined with respect to each other when, respectively, engaged with a right and a left gear tooth flank. These paths of movement, when, respectively, engaged with the right tooth flank and the left tooth flank, intersect each other at an intersection point which is placed outside of the base circle; further, a tangentially extending path portion of the moving path of the sensor, upon engagement with the right flank and the left flank of the gear teeth, is placed close to the region of the intersection point.

The inclined moving paths of the sensor, for checking the right and left flanks of the gear teeth, respectively, can be obtained by controlling the sensor to move not only along one coordinate axis but, rather, to move along two axes, for example x and y-axes. Movement along the x-axis may be in an essentially tangential movement path, with respect to the base circle of the gear. The inclination of the movement path, when in engagement with one of the flanks, will then be contributed by the additional movement in the x-axis.

The method, carried out by the apparatus in accordance with the invention, thus departs from prior arrangements in which the measuring sensor is moved along an x-axis in a path corresponding to a tangent to the base circle of the gear as the gear rotates. In accordance with a feature of the invention, the movement of the sensor along the x-direction, by an X-carriage, will have a movement in a direction perpendicular thereto superimposed thereon, that is, in the y-axis direction for example. Thus, with respect to the x-axis of movement of the carriage, for example, the composite movement will be at an inclination. The result will be a substantial decrease of the respective movement distances to be covered for any one test cycle or testing step of a flank, or a pair of flanks of teeth of gears.

Arranging the paths of movement of the sensor for testing, respectively, right and left gear flanks so that they cross each other results in substantial shortening of the necessary range of movement of the sensor in the direction of the x-axis. Thus, a carriage or slider operable along the x-axis need not be deflected for a long distance resulting in substantial decrease in size of the measuring apparatus and also making the measuring apparatus substantially less expensive. Further, the smaller deflection distance results in substantial increase of measuring cycling times. The advantages of testing by roll-off of the gear with respect to a measuring sensor is retained by carrying the measuring sensor continuously over its path used for testing of the respective flank of the gear. The measuring sensor is moved uniformly, that is, without either positive or negative change of speed, that is, without acceleration or deceleration.

In accordance with a preferred feature of the invention, the point of intersection of the operating paths of the sensing head, for, respectively, testing or checking right and left flanks of the gears, is placed centrally of the testing path. This arrangement minimizes the range of movement over which the measuring sensor has to travel, which further reduces costs and improves accuracy.

Drawings illustrating testing methods and an illustrative embodiment:

DETAILED DESCRIPTION

Figure 1:
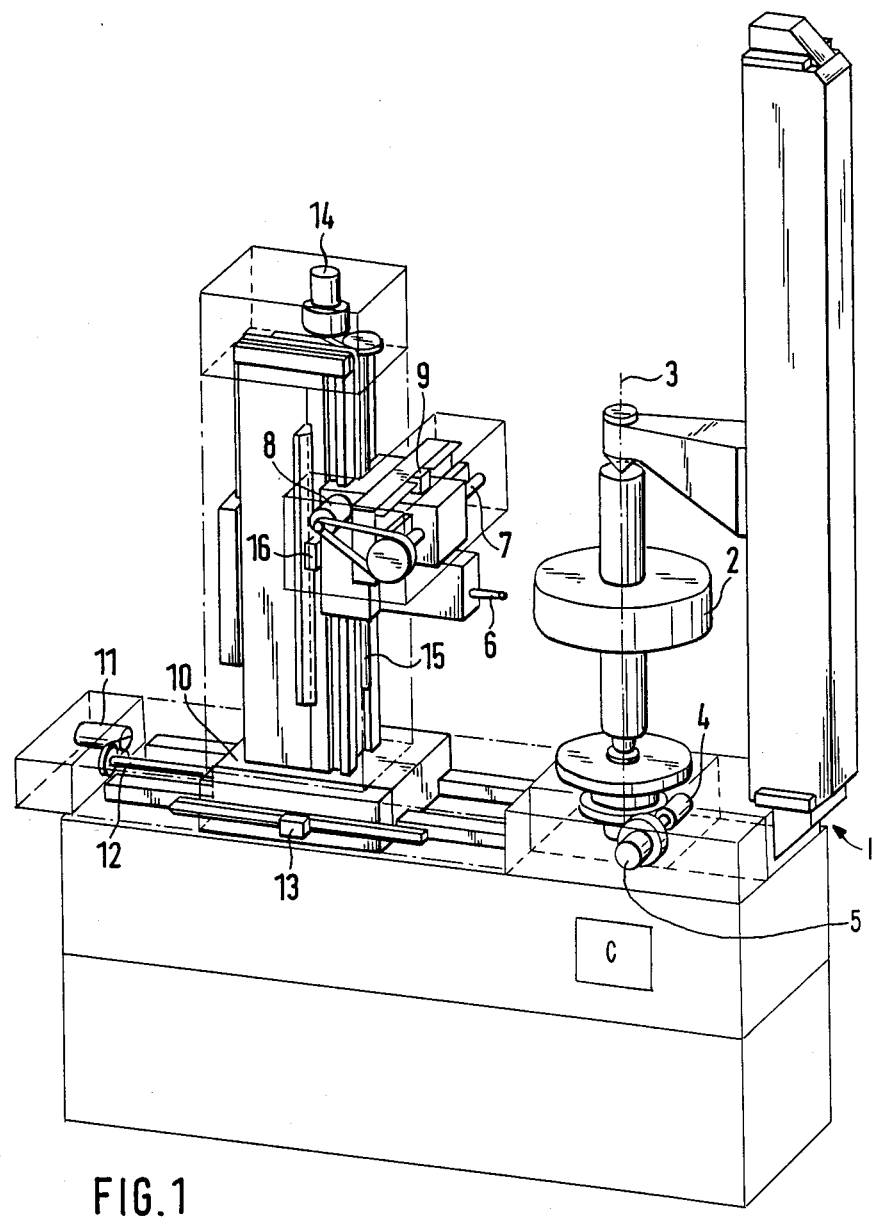
FIG. 1 is a schematic, highly simplified perspective view of a test apparatus suitable for carrying out the method.

The testing apparatus has a support or frame 1 on which a gear to be tested 2 is secured, rotatable about its vertical axis 3. The gear can be rotated by a gearing 4 which is coupled to a motor 5. The motor 5 is accurately controlled in its angular rotation by a computer control apparatus, schematically shown at C. Control or input elements for the computer C, and connections within the frame or support 1 have been omitted from the drawing for clarity.

A testing, measuring or sensing head 6 is located opposite the gear 2. The testing or sensing head 6 is retained on a combination of slide carriages, permitting movement in three coordinate directions. The slide arrangement has a horizontal carriage 7, operable in an x-axis, horizontally transverse to the direction of the axis 3 of the gear, and in a plane transverse to the axis 3. The slide 7 may also be referred to as the X-carriage. It is driven by a computer-controlled motor drive 8, coupled to the computer C. Its longitudinal movement is sensed and detected and can be read on a glass scale 9 which, schematically, represents also a longitudinal displacement transducer to feed back the actual longitudinal displacement movement of the sensor 6 to the computer C.

In accordance with a feature of the invention, an orthogonally arranged y-axis Y-carriage 10 is provided, movement of which is controlled by a positioning spindle 12 rotated by a motor drive 11, under control of the computer C. The Y-carriage 10 also has a transducer apparatus to determine longitudinal travel of the measuring head 6, shown schematically as a glass scale 13. The systems for longitudinal distance measurement, if in the form of transducers, are well known and need not be described in detail. They provide actual path distances to the computer to permit control of the movement of the respective slides in a closed loop.

The sensor can, additionally, be deflected vertically in an axis parallel to the axis 3 of the gear by a computer-controlled motor drive 14, rotating a positioning spindle 15. A longitudinal displacement transducer, illustrated in form of a longitudinal measuring scale 16, is provided to control longitudinal movement.

The apparatus is illustrated in FIG. 1 in a highly schematic representation, to show, merely, the necessary components and elements which are required to carry out the method of the present invention and which are required in an apparatus.

Figure 2:
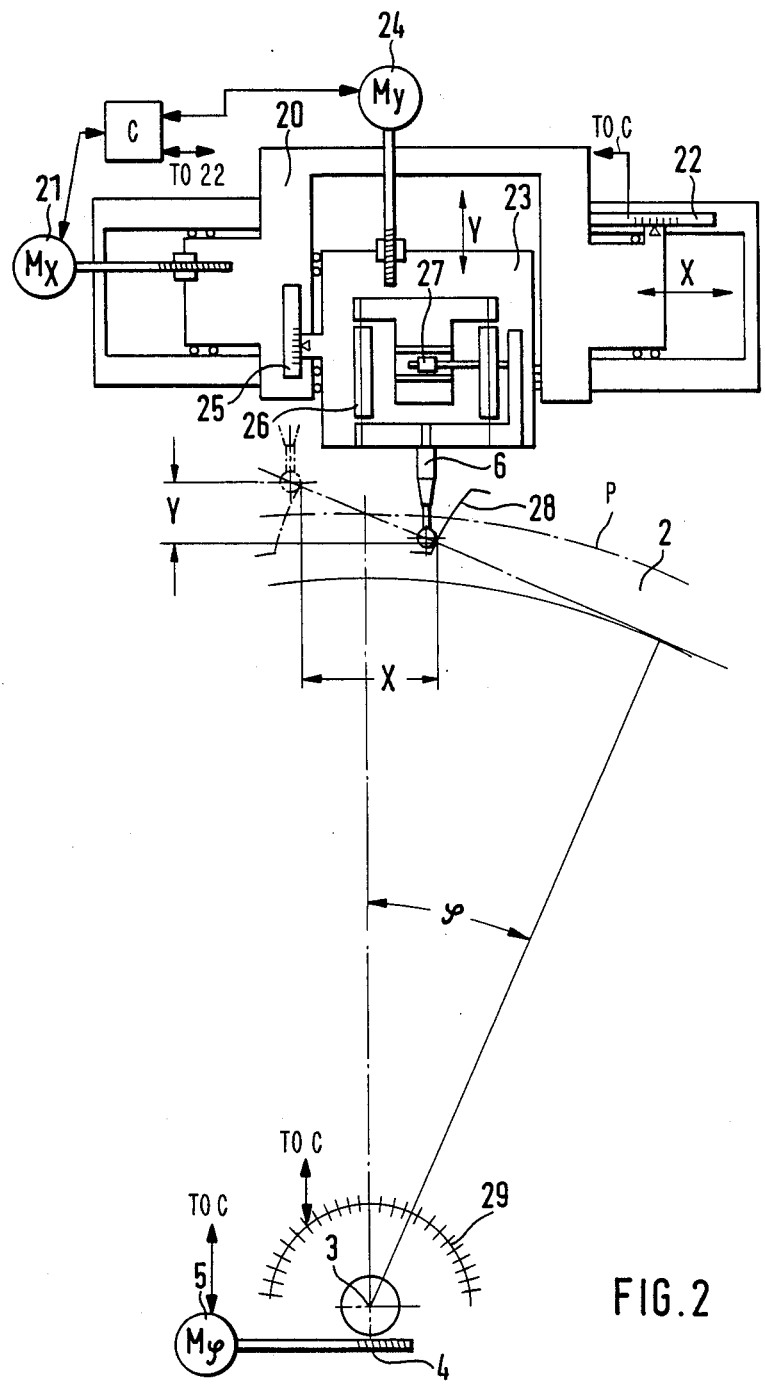
FIG. 2 is a schematic, highly simplified top view of a carriage arrangement for carrying a sensor operable radially and tangentially with respect to a gear.

FIG. 2 is a top view, drawn highly schematically and omitting any elements not necessary for an understanding of the invention, of the components required to displace the sensing head 6 to carry out the method of the present invention.

An X-carriage 20 is located horizontally shiftably in a plane transverse to the axis 3 of the gear 2. The shifting movement is controlled by a motor drive 21 which, in turn, is controlled to operate in accordance with signals from the computer C. The deflection path can be visually read, and/or electrically transduced and signalled to the computer C, so that movement in the x-coordinate direction can be controlled in a closed loop. A Y-carriage 23 is operable in a coordinate direction transverse to the direction of operation of the X-carriage 20, that is, essentially in radial direction with respect to the gear 2. The movement distance or movement path is determined by a Y-transducer or scale 25 which transfers its measurement data to the computer C through connecting lines similar to the connecting lines between transducer 22 and computer C, and omitted from the drawing for clarity. The Y-direction motor 24 is controlled from the computer C in accordance with a preprogrammed operation.

The sensor 6 is retained on a leaf spring support 26, as well known, to permit deflection thereof. The extent of deflection of the sensor 6 can be determined by the transducer 27 which, likewise, is coupled to the computer C by suitable connection lines, omitted from the drawing of FIG. 2 for clarity.

As can be seen from FIG. 2, the measuring arrangement permits testing of an involute curve of a flank 28 of the gear 2 by moving the sensor 6 by a value X and Y tangentially with respect to the gear 2 during the time when the gear is driven about the angle $\phi$ by the gear motor 5. The gear motor 5, likewise, is controlled by the computer C. An angle measuring transducer 29 is provided to accurately control the angular rotation of the gear, and provide feedback information to the computer C. Movement of the sensor, as well as rotation of the gear 2, are controlled by the computer in accordance with the mathematical law defining the involute curve of the gearing by suitable energization of the motors 21, 24 and 5. FIG. 2 also shows, in chain-dotted lines, the pitch circle of the gear 2.

The method of testing or checking a gear tooth, as carried out by prior art apparatus as well as by the apparatus in accordance with the present invention and in accordance with the method of the present invention, will be described with reference to FIGS. 3 and 4.

Checking an external gear-prior art

Figure 3:
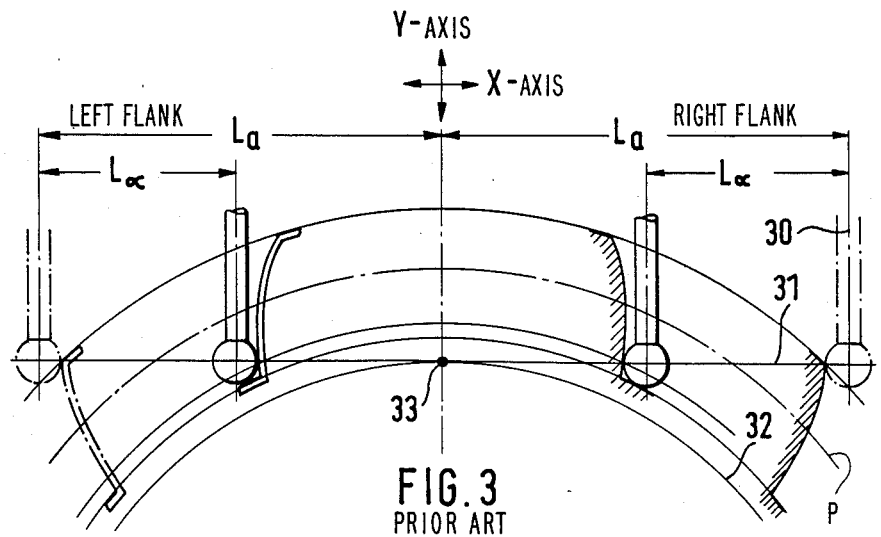
FIG. 3 is a schematic drawing illustrating the position of sensing heads on an external gear, in accordance with the prior art.

FIG. 3 illustrates, schematically, the sequence of a testing cycle as known. The measuring or sensing head 30 is moved entirely by tangential movement of the X-carriage 20. This is done for testing both the right as well as the left flanks of the gear teeth. The path is along a straight line 31, tangential to the base circle 32 of the gear wheel. At the same time, the gear is rotated in accordance with the roll-off of the path 31 about the base circle 32. The tangential path 31 is coincident with the base circle 32 at a point 33 which, in an involute gear tooth, as known, is the origin of the involute forming the gear tooth.

For testing of the left and right gear tooth flanks, respectively, which correspond, respectively, to the left or right flank with respect to the origin 33 of the involute, and can be carried out only with respect to this origin, a standard roll-off length $L_a$ is required, both for the right as well as for the left side with respect to the origin 33 of the involute. This results in a profile testing region, however, which is much shorter, namely $L_\alpha$. In the prior art method, the required movement of the X-carriage and, hence, of the sensor 30, must be twice the distance $L_a$ along the path given by the line 31.

For ease of visualization, the x-axis as well as the x-axis are shown in FIG. 3; it is to be noted, however, that the measuring head does not move along the y-axis.

Checking an external gear—this invention

Figure 4:
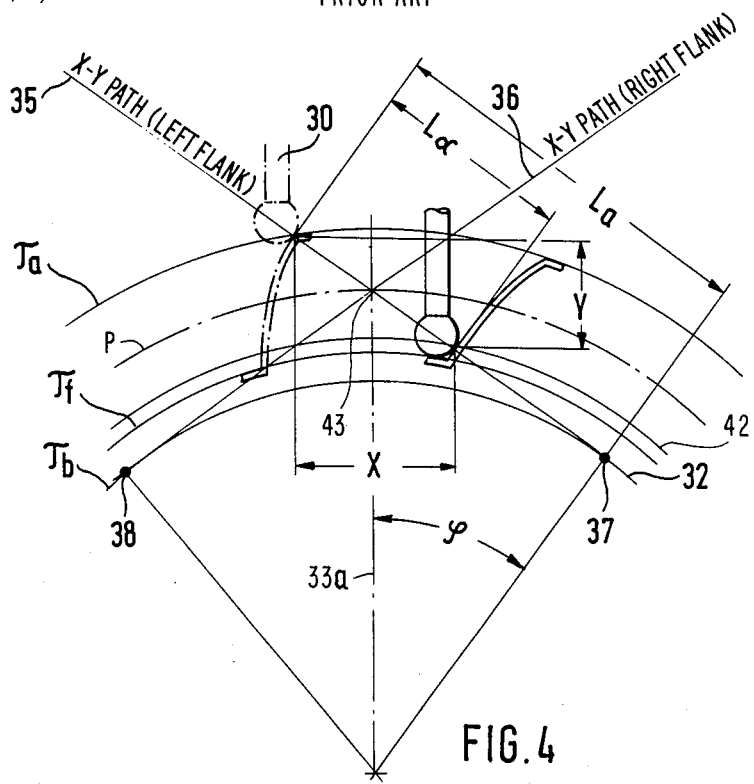
FIG. 4 is a drawing similar to FIG. 3 but illustrating the position of the sensing head in accordance with the present invention.

The comparison between FIGS. 3 and 4 will clearly show the difference between the present invention and the prior art. As briefly discussed in connection with FIG. 2, the measuring sensor 30 is movable both in the x-axis direction by the X-carriage 30 as well as in the y-axis direction by the Y-carriage 23. This movement, as seen in FIG. 4—in which the x-axis and the y-axis will have the same relationship as shown in FIG. 3— shows that the testing of the left flank is carried out by moving the head in a path given by the path line 35. For the right tooth flank, the path is the path shown by the line 36. The lines 35, 36, as clearly seen in FIG. 4, are inclined with respect to each other, and cross at a crossing point 43 outside of the base circle 32. The crossing point is so arranged that, with respect to the right and the left tooth flanks, respectively, the paths of the X-carriage 20 and of the Y-carriage 23 are within the same respective range, or, in other words, are within a similar range, as shown by the dimension x and y in FIG. 4. As a consequence, the radius 33a which passes through the point of origin 43 is the center line against which identical angles $\phi$ towards the right, and towards the left, respectively, are measured which pass through the respective origins 37 and 38 for the involute curves for the left gear flank and for the right gear flank, respectively. Thus, the origin point 37 is the origin for the involute of the left flank, shown in full lines in FIG. 4; the path 35 is tangent to the base circle 32 at point 37; for the right flank—not shown in FIG. 4—the path 36 is tangent at point 38. FIG. 4 also illustrates the pitch circle P and further circles $\tau_a$ and $\tau_f$, to be discussed below.

Similar differences between the prior art and the method in accordance with the present invention arise when the testing the gear flanks of internal gears.

Checking an internal gear—prior art

Figure 5:
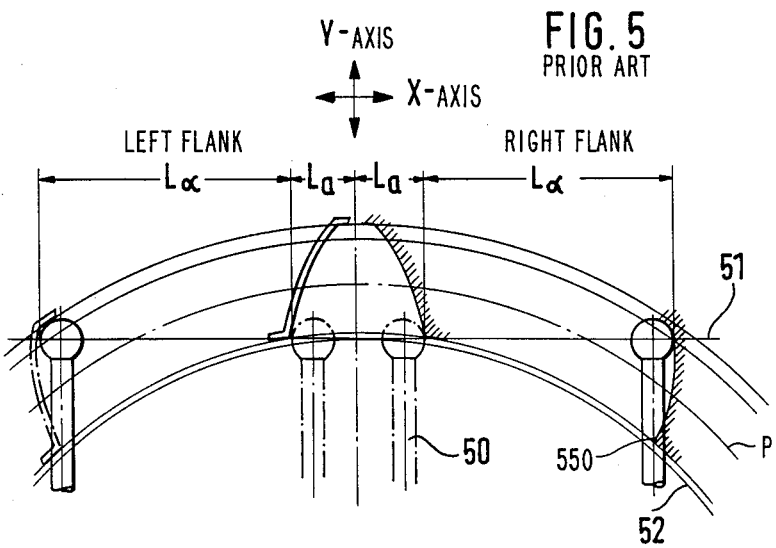
FIG. 5 is a drawing illustrating the position of a sensing head for an involute inner gear in accordance with the prior art.

FIG. 5 illustrates the relationship for an internal gear, and is coordinate with FIG. 3. The sensor 50 is moved along a horizontal path 51 in the x-axis upon simultaneous rotation of the gear wheel. This results in roll-off against the base circle 52 of the gearing during translatory movement of the sensor 50, superposed on the rotation of the gear.

FIG. 5 clearly shows that, to test the right and left gear flanks, respectively, by moving the sensor 50 along the line 51, a range of movement for the sensor is required which is substantial. For internal gears, a further problem arises in that, frequently, the sensor 50 may collide with an edge of the internal gearing, as shown at the extreme position of the sensor at point 550 in FIG. 5. In order to avoid such collision, it has been proposed to use sensing heads which deviate from the showing of the sensor 50 in FIG. 5 by providing sensing heads formed with a depression or a small "dog-leg" or angled region, or which are installed at an angle. In order to test right and left flanks, however, it is necessary to use sensing heads which are angled off in different directions or to place them at inclined positions with opposite angles of inclination. The angling or offsetting of the sensing heads may introduce inaccuracies and further requires resetting of the sensing head when testing right and left flanks, respectively.

Checking an internal gear—this invention

The range of movement of the sensing head, when moved in two coordinate directions along the x-axis and the y-axis, can be substantially decreased, The paths of movement, lines 65 and 66, to test the involute curve of right and left gear flanks are, again, inclined with respect to each other, so that the paths intersect at an intersecting point 53, which is located outside of the base circle 52 of the gear. Again, the origin 54 of the involute curve defining the left flanks of the gear is located at the right of the intersecting point 53; the origin 55 for testing the right flanks of the gear is located at the left of the intersecting point 53. With respect to the radius 53a passing through the center of the gear and the intersecting point, the origins of the involute curves 54 and 55 are offset by the angle $\phi$.

Figure 6:
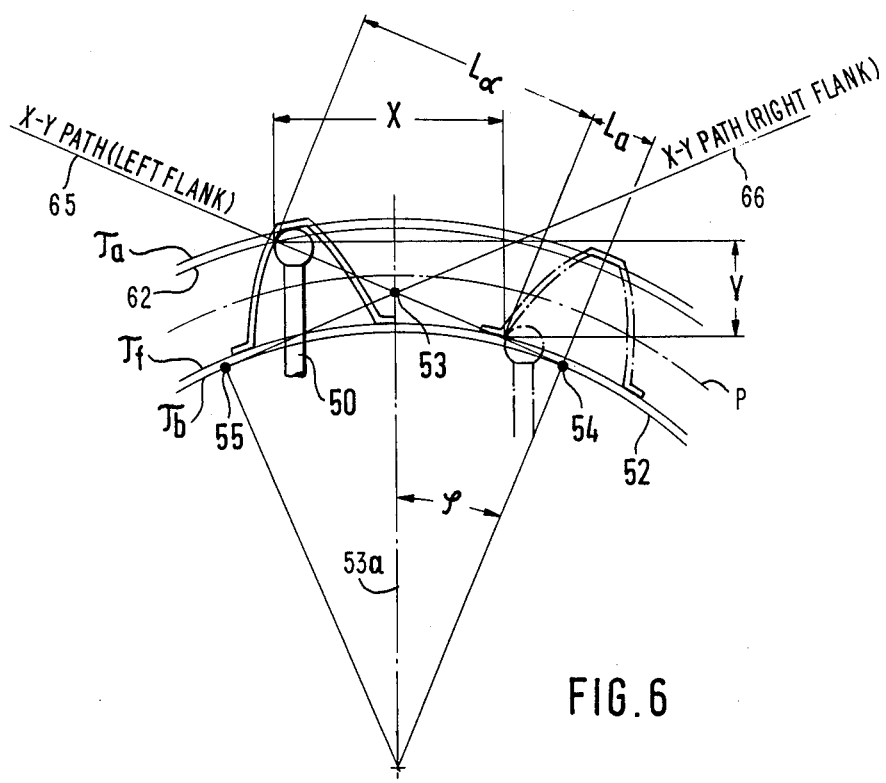
FIG. 6 is a schematic illustration of the positions of a testing head for testing an involute inner gear in accordance with the present invention.

The arrangement has the substantial advantage, as clearly shown in FIG. 6, that an identical sensing head 50 may be used for checking both the right as well as the left flanks of the internal gears without danger of collision with an internal gear. Thus, resetting or refitting the measuring apparatus is not necessary when changing over from testing left gear flanks to right gear flanks even when internal gears are to be checked.

Reverting again to FIGS. 1 and 2:

The law of an involute curve is a mathematical function well known; the mathematical function is recorded or stored in the computer or control apparatus C for the particular gear to be tested, so that the movement can be controlled by the control or computer apparatus, controlling, in turn, drive of the motors 5, 21 and 24, respectively. The respective values are sensed by suitable transducers and, with respect to the drive of the gear 2, by an angle sensor 29 (FIG. 2). Combining the data derived from the transducers 22 and 25 as well as the angle sensor 29 provides feedback information to the computer C, so that actual and desired positions can be compared and corrections effected in a closed-loop system, as well known. The guidance of the sensor in accordance with an involute curve can be used not only to test corresponding involute flanks on gear teeth but can also be used to test flanks of different types of gearing or teeth, the mathematical curve of which is not precisely an involute curve but is in the range of measurement which can be carried out by the path of the measuring sensor 6 or 30 or 50 within the range of an involute curve, in general.

Mathematically, for a normal involute gearing, the angle $\phi$ can be defined as follows:

$$\phi = \arc \tan \frac{\sqrt{r_a^2 - r_b^2}}{2r_b} \tag{1}$$

wherein, for normal involute gearing, the radius of the root circle $r_f$, shown in FIGS. 4 and 6 as $\tau_f$, is equal to the radius $r_b$ of the base circle and shown in FIGS. 4 and 6 as $\tau_b$. FIGS. 4 and 6 also show the tip circle $\tau_a$.

Gear teeth which deviate from a normal involute curve, for example gear teeth of the Wildhaber-Novikov type, or other gear teeth, require entry of correction values to the basic relationship given above; correction values must also be entered if the involute gear has a gearing in which the radius of the root circle is larger than the radius of the base circle. FIG. 4 also shows a circle 42 which is the innermost circle of flank engagement with the measuring head 30. The corresponding measuring head engagement circle is shown at 62 in FIG. 6.

The computer which is used is a standard article, customary in current gear test apparatus, and is required to control the movement of the sensor in the x-axis and y-axis directions on the one hand, and control coordinate rotation of the gear 2 in accordance with the law of the involute curve of the gear to be tested. Thus, the sensor is guided along the gear flank in accordance with an ideal, that is, error or deviation-free involute. Deviations from this ideal curve are then sensed by the sensor and can be recorded in the computer.

The apparatus to carry out the method can be a standard gear test apparatus modified, only, by adding the y-axis Y-carriage 23 (FIG. 2). Basically, it utilizes the X-carriage 20, coupled to the motor drive 21, to drive the X-carriage under control of the computer C in accordance with the mathematical relationship of the involute curve of the gearing of the gear 2, while the gear 2 is being rotated by the gear rotation motor 5. The sensing head 6 is moved along a straight path which is tangential to the base circle 32, 52 (FIGS. 4, 6), respectively, and compatible with the profile of the flank. In accordance with the invention, the measuring sensor 30, 50, respectively, has a movement additional to the x-axis movement superimposed by the Y-carriage 23, that is, perpendicular to the x-axis. The Y-carriage 23 has its own motor drive 24, likewise controlled by the computer C. As a result, the measuring head is moved in a path which deviates from that of only the x-axis or only the y-axis but, rather, is moved in a straight-line path which is tangential to the base circle for testing the profiles, both of external as well as of internal gears, while the gear rotates in accordance with the roll-off movement which is derived from the composite of the movement applied to the measuring or sensing 30, 50, respectively, by the two X and Y-carriages 20, 23.

Various changes and modifications may be made within the scope of the inventive concept.

A suitable computer apparatus C is: Each process control computer having data as inputs and giving electrical signals as outputs. Such apparatus was intended to operate only in one coordinate direction, that is, in the x-axis. It is an easy matter to additionally introduce, by way of well known coordinate programs, data into the computer to control the respective sensing heads 6, 30, 50 to move along the inclined intersecting paths rather than along a tangential path only. Such programs, to control two orthogonal slide motors, are well known in the industry.

Wildhaber-Novikov gears are described and shown in: VDI-Z 122 (1980) No. 12-June; and round-flank toothing or circarc gears in Lueger, Technological Dictionary (In German) vol. 14, 1969, page 570/571.

The invention has been explained in connection with two slides operating in orthogonal x-y coordinate directions. The measuring or sensing heads 6, 30, 50 could, equally, be controlled to operate in accordance with polar coordinates, in which the angle of inclination of the respective paths is determined and the radial extent or projection of the sensing head is controlled.

I claim:

1. A method for checking or testing the profile of flanks of a gear tooth of the gear and especially of a tooth having involute shape, utilizing a gear flank checking or testing apparatus, especially to check gear teeth having involute shape, said apparatus having means (4, 5) for rotating the gear (2);

a measuring and sensing head (6, 30, 50);

means for moving said measuring and sensing head in a plane transverse to the axis (3) of the gear (2) being tested, while maintaining the measuring and sensing head in engagement with a selected flank of a gear tooth; and means (C) for controlling said moving means and said gear rotating means for rolling off the measuring and sensing head against a selected flank of said gear tooth, comprising the step of controlling said moving means by said controlling means (C), to move the measuring and sensing head (6, 30, 50) in predetermined paths (35, 36; 65, 66) when the measuring head is in respective engagement with a right gear tooth flank and a left gear tooth flank of a tooth, which predetermined paths are inclined with respect to each other and intersect with each other at an intersection point (43, 53) outside of a base circle (32, 52) of the gear; and further place a tangential moving path portion of said controlled movement required, respectively, for engagement with a right flank and left flank of a gear tooth in a region close to said intersection point (43, 53).

2. The method according to claim 1, wherein said intersecting point is positioned centrally between the respective paths (35, 36; 65, 66) of said measuring and sensing heads (6, 30, 50) when checking, respectively, the right and left flanks of the gear teeth.

3. The method according to claim 1, wherein said paths each have a path component which extends in a direction tangential to the base circle of the gear and a further path component which extends in a direction radially with respect to the gear.

4. The method of claim 1, wherein said intersection point (43, 53) is located on a radial line passing through the center of the gear;

and said intersecting point, further, is positioned at a tangential line connecting the origin of an involute curve defining the respective gear flank with at least approximately the base circle of the gear and said radial line.

5. The method according to claim 1, wherein said controlling step comprises simultaneously moving said measuring and sensing head in two mutually orthogonal directions (x, y).

6. A gear flank checking or testing apparatus, especially to check gear teeth having involute shape, having means (4, 5) for rotating the gear (2);

a measuring and sensing head (6, 30, 50);

means for moving said measuring and sensing head in a plane transverse to the axis of the gear (2) being tested, while maintaining the measuring and sensing head in engagement with a selected flank of a gear tooth; and means (C) for controlling said moving means and said gear rotating means for rolling off the measuring and sensing head against a selected flank of said gear tooth, wherein said moving means comprises a first moving means (7, 20) moving said measuring and sensing head in a direction tangential to at least approximately a base circle of the gear;

and second moving means (10, 23) moving the measuring and sensing head in a direction radial with respect to the axis (3) of the gear, said controlling means (C) controlling movement of the measuring and sensing head in two paths (35, 36; 65, 66) which, when in respective engagement with a right gear tooth flank and a left gear tooth flank of a tooth, are inclined with respect to each other, intersect each other at an intersection point (43, 53) outside of at least approximately the base circle (32, 52) of the gear, and to place said measuring and sensing head at a tangential path portion when in engagement with the right flank and left flank of the gear teeth, respectively, which is located in the region of the intersecting point, said controlling means (C) additionally controlling the rotating means for rotation of the gear for roll-off of the respective right and left flanks of the gear teeth against said measuring and sensing head.

7. The apparatus according to claim 6, wherein said first and second moving means move the securing head in respectively mutually orthogonal directions (x, y).

* * * * *